Figure 1:
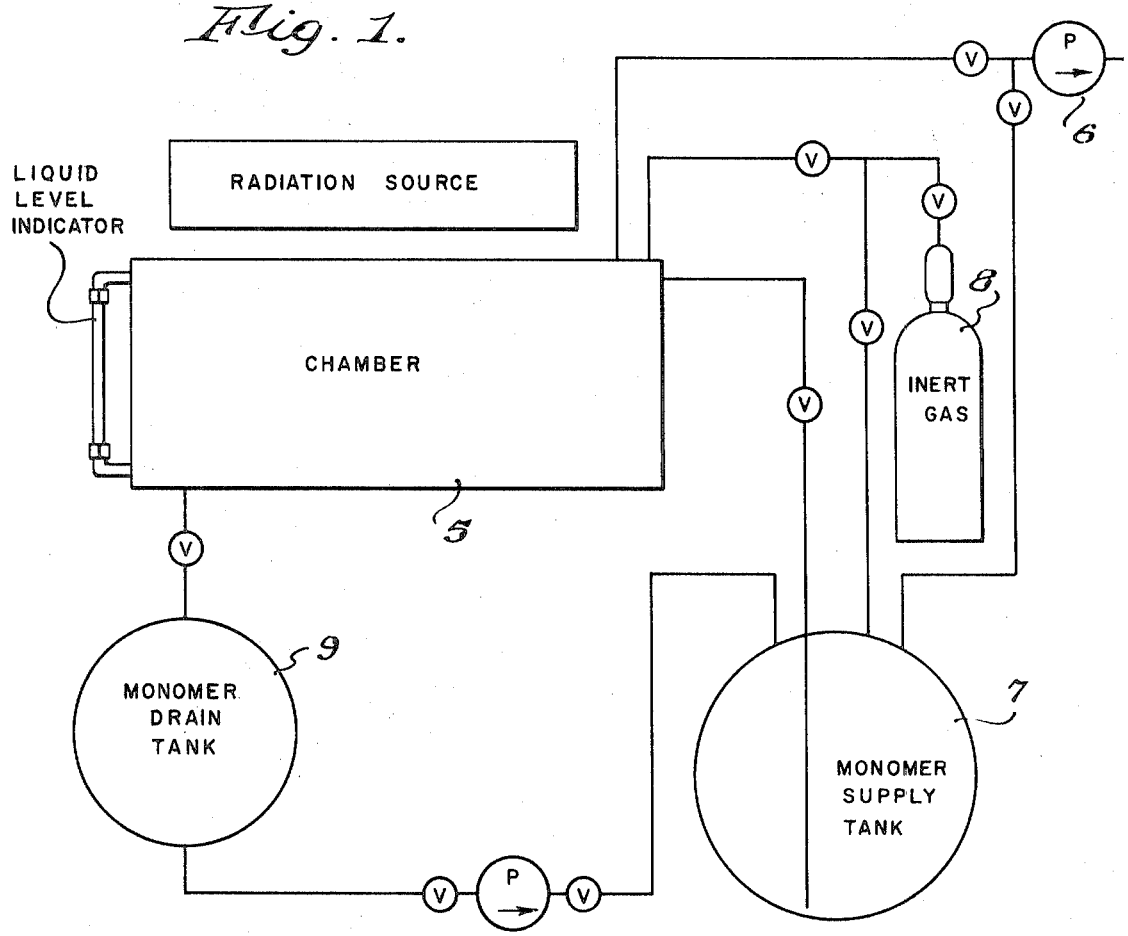

United States Patent

[11] 3,607,355

[72] Inventor William A. Loeb
Chappaqua, N.Y.
[21] Appl. No. 620,708
[22] Filed Mar. 6, 1967
[45] Patented Sept. 21, 1971
[73] Assignee ISO Nuclear Corporation
New York, N.Y.

[54] METHOD OF MAKING FUSED VENEER-PLASTIC PRODUCT
3 Claims, No Drawings

[52] U.S. Cl. .................................................... 117/59,
117/93.31, 117/148
[51] Int. Cl. .................................................... B44d 1/50,
B44d 1/28, B27k 3/08
[50] Field of Search ........................................... 117/59,
147, 148, 93.31, 161 UC, 161 UF; 156/285, 289;
161/406, 407

[56] References Cited
UNITED STATES PATENTS
3,243,140 3/1966 Bliven ........................... 117/148 X
3,373,068 3/1968 Grosheim ..................... 156/289

Primary Examiner—William D. Martin
Assistant Examiner—William R. Trenor
Attorney—Sandoe, Hapgood & Calimalde

ABSTRACT: This invention is directed to the production of fused veneer-plastic products in multiunit quantities by impregnating a separator-interleaved stack of veneer sheets with a liquid plastic monomer and polymerizing the monomer in situ by irradiation with X or gamma rays.

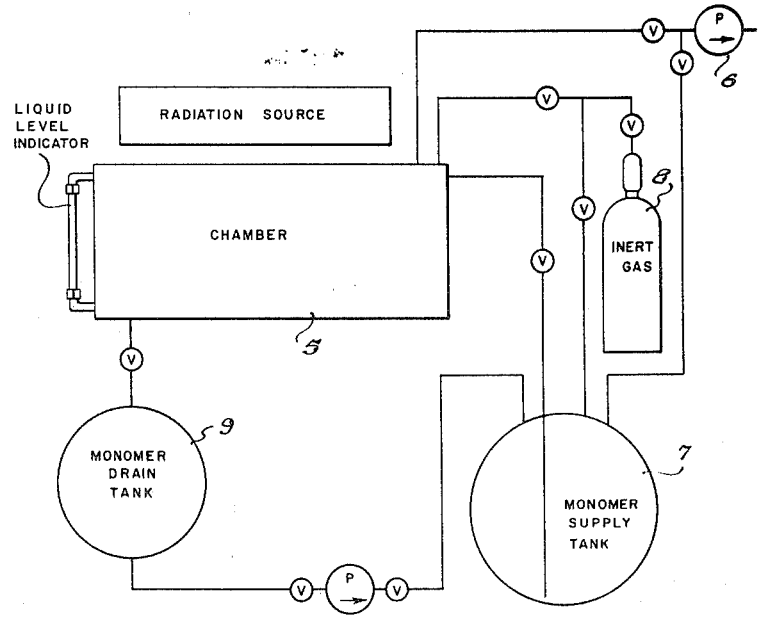

INVENTOR.
William A. Loeb
BY

ATTORNEYS.

METHOD OF MAKING FUSED VENEER-PLASTIC PRODUCT

THE INVENTION

This invention relates generally to new and useful improvements in impregnated cellulosic products and particularly seeks to provide a novel method for the in situ polymerization of monomer-impregnated sheets of veneer to produce a fused veneer-plastic product.

Heretofore many different ways of impregnating wood products with various materials have been proposed ranging from the simple pressure creosoting of poles and ties to multistep surface impregnation with plastics and other materials.

It has also been proposed to pressure-impregnate solid wood pieces, as distinguished from veneers, with a polymerizable plastic and then effect polymerization by nuclear radiation. The resultant wood-plastic product is abrasion and stain resistant, strong and is easily finished or refinished simply by sanding and/or buffing. However, for some unknown reason, such a process is not effective with wood veneers.

Wood veneers have long been used in the manufacture of furniture and plywood and in such uses the exposed surfaces generally require finishing by painting, varnishing or other surface treatment in order to provide desirable appearance, abrasion and stain resistance and washability. In many instances these characteristics are expensively developed by bonding a medium or high density decorative plastic overlay to the exposed surface.

In accordance with this invention, however, it is possible to produce veneers filled or impregnated with a polymerized plastic and having the desired physical characteristics without having to apply a decorative overlay or having to employ finishing operations other than sanding or buffing.

Therefore, an object of this invention is to produce a fused plastic impregnated veneer in which the plastic component thereof is polymerized in situ by X or gamma ray radiation.

Another object of this invention is to provide a veneer of the character stated in which at least the surface to be exposed to view is uniform in appearance and character, is abrasion and stain resistant and is readily washable.

Another object of this invention is to provide a veneer of the character stated that can be finished or refinished simply by sanding or buffing the exposed surface.

Another object of this invention is to provide a method for manufacturing veneers of the character stated in which stacked sheets of natural veneer are pressure impregnated with a plastic monomer in an inert atmosphere, the excess monomer is then removed and the impregnated sheets are exposed to X or gamma ray radiation to effect the in situ polymerization of the monomer.

Another object of this invention is to provide a method of the character stated in which the veneer sheets are interleaved with unreactive separator sheets at least coextensive in area with the veneer sheets to prevent weeping of the monomer and avoid irregular or incomplete polymerization thereof at and adjacent the prospective exposed flat surfaces of the completed product.

A further object of this invention is to provide a method of the character stated in which the veneer sheets, either prior or subsequent to monomer impregnation, are platen pressed to flatten out any surface undulations thus assuring uniformly flat surfaces upon the completion of polymerization of the monomer.

A further object of this invention is to provide a method of the character stated in which the interleaved veneer stacks are first subjected to a substantial vacuum to remove air, free moisture and any volatiles that may be present.

A further object of this invention is to provide a method of the character stated in which the radiation dose to effect polymerization of the impregnated monomer is on the order of from about 1 to about 1.5 megarads.

Figure 2:
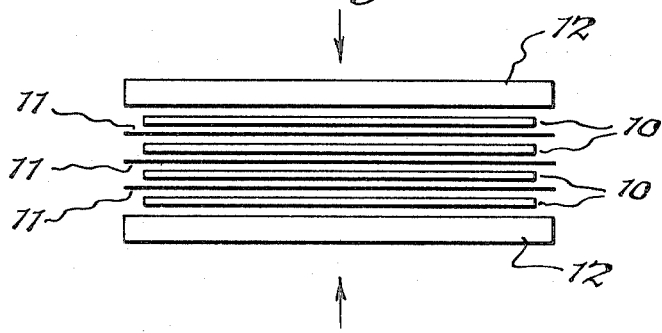

With these and other objects, the nature of which will be apparent, the invention will be more fully understood by reference to the drawings, the accompanying detailed description and the appended claims. In the drawings:

FIG. 1 is a schematic flow diagram of a typical installation for practicing the method of this invention; and FIG. 2 is an expanded end elevation of a stack of interleaved veneer sheets positioned intermediate a pair of pressure platens.

Referring to the drawings in detail, it will be seen from FIG. 1 that a typical equipment installation for practicing this invention includes a chamber 5, for containing one or more stacks of interleaved veneer sheets to be treated, connected to a vacuum pump 6 for exhausting air and moisture therefrom and from the veneer sheets. A monomer supply tank 7 is connected to both the chamber 5 and the vacuum pump 6. The vacuum pump thus may be used to degas or deaerate a fresh supply of monomer so that undesired gas or air will not be introduced into the chamber 5 when it is filled with the monomer. A supply tank 8 of pressurized or liquified inert gas, preferably nitrogen, is connected to the chamber 5 and to the monomer supply tank 7 and is used to establish an inert pressurized atmosphere in the chamber and also to transfer monomer from its supply tank to the chamber. Alternatively, the monomer may, of course, be transferred by a suitable pump or by gravity. A drain tank 9 is used to collect excess monomer from the chamber after the veneer impregnation has been completed and may be connected to the monomer supply tank 7 so that the unused monomer from the drain tank may be recycled.

The chamber 5 contains an internal base or support (not shown) for the stacks of veneer and is also provided with suitable means (not shown) to slightly compress the stacks after monomer impregnation has been completed.

In order to avoid irregular drainage losses of the impregnated monomer and to insure uniform polymerization thereof while being irradiated, it is important that the veneer sheets in each stack be interleaved with separator sheets at least coextensive in area therewith and preferably extending beyond the edges thereof. This arrangement is illustrated in FIG. 2 of the drawings in which the sheets 10 of a veneer stack are interleaved with separator sheets 11 and the interleaved stack is carried between a pair of platens 12,12 that may be operated to apply pressure to or release pressure from the stack.

The separator sheets 11 are preferably formed from any suitable smooth material, such as aluminum or stainless steel sheet or foil, that will not become bonded to the veneer sheets when the monomer is polymerized. Paper or paperboard that has been coated on two sides with a coating that is unreactive under these operating conditions would also readily be usable as separators. Paper or paperboard that has been coated with such a coating only on one side could be used, since the coated side would strip cleanly from the veneer surface it contacts and the veneer sheets could be readily separated after polymerization of the monomer. However, with this type of separator the uncoated side of the paper probably would absorb a quantity of the monomer and become bonded to the adjacent veneer so that the separator sheet would have to be mechanically removed as by sanding if it is desired to have that face of the veneer exposed for any purpose. Uncoated paper should not be used as separators because both sides will absorb the monomer and each will become bonded to its associated veneer and the stack of veneer sheets would become a solid laminate.

In the actual practice of this invention veneer sheets selected from any desired type of wood (walnut, cherry, pine, birch, or maple, for example) and of any selected thickness common to veneers (from about one-twentieth to about one eighty-fifth inch, for example) are stacked and interleaved with separator sheets as shown in FIG. 2 and then inserted between the platens 12,12 that are operably mounted within the opened chamber 5. The chamber is then tightly closed and evacuated by the vacuum pump 6 to a vacuum equivalent to from about 25 to about 29 inches of mercury to extract most, if not all, of the entrained air and free moisture from the veneer sheets.

A degassed liquid plastic monomer, such as methyl methacrylate, butyl methacrylate, vinyl acetate or a styrene-acrylonitrile mixture is then admitted to the chamber 5 from the supply tank 7 until the veneer stack is completely covered. The chamber 5 will, of course, be fitted with a suitable liquid level gauge to determine the height of the liquid therein. Nitrogen or other inert gas is then admitted from the tank 8 into the void above the liquid in the chamber and the pressure is raised to from about 15 to about 150 p.s.i.g. for from about 5 to about 30 minutes to force the liquid monomer into the pores of the wood. At this point the pressure may be held, reduced or released and the excess unabsorbed liquid monomer is drained out of the chamber 5 into the tank 9 while at the same time maintaining an atmosphere of the inert gas within the chamber.

Now the platens 12,12 are operated to apply sufficient light compression to the impregnated stack of veneer sheets to flatten any surface undulations, and then the lightly compressed stack is subjected to X or gamma ray radiations on the order of from about 1.0 to 1.5 megarads to polymerize the monomer within the veneer sheets and result in fused veneer-plastic products.

The polymerization is exothermic, but because the separators 11 can absorb and dissipate heat, it is not normally considered necessary to provide means for cooling the atmosphere within the chamber 5, although such cooling can be easily provided if desired.

The platen pressure is removed from the stacks and the chamber 5 is opened to permit the stacked sheets to be removed. The thus treated veneers are easily stripped from the separators 11, which can be either reused or discarded, and can be surface finished simply by sanding or buffing either before or after being bonded to a layer of base stock.

It is assumed that in the end use applications of wood plastic veneers produced in accordance with this invention, the finished products will be balanced against warping as is customary by having a balancing veneer applied to the back sides of the cores or base pieces to which these veneers are applied.

The principles of this invention may also be followed by employing a solution of polymer in the monomer, instead of the pure monomer, as the impregnant. Although such a solution would have a viscosity somewhat higher than that of the pure monomer, this would not be detrimental to the process since the tendency of the solution to weep out of the impregnated veneers prior to polymerization would be reduced and the production of a more uniform coating at the surfaces of the veneers would be enhanced.

In some instances it may be found desirable to employ a small amount of wetting agent with the monomer to assist in the uniform spread of monomer by capillary action in the thin spaces or voids between the veneer sheets and the separators.

It is also considered within the scope of this invention to employ as starting materials veneer sheets that have been laminated on one face to a backing of aluminum or other material that is nonreactive under these operating conditions, or which has been either permanently or releasably coated by such a nonreactive material. In such instances the backing or coating will serve the same function as the separator sheets 11 and consequently the separator sheets need not be used.

Thus in accordance with this invention thick stacks of monomer-impregnated veneer sheets can be efficiently irradiated by X or gamma rays to polymerize the monomer in situ under such conditions that weeping or migration of the plastic from the veneer surfaces is minimized as is its shrinkage during polymerization.

I claim:

1. In a method for producing fused veneer-plastic products using monomer as an impregnant the steps of, placing a stack of veneer sheets of untreated wool in a closed chamber between a pair of platens, said sheets being interleaved with separator sheets at least coextensive in area with said veneer sheets for preventing weeping or migration of monomer from the surfaces of the veneer sheets and for preventing said veneer sheets from becoming bonded together as a result of the polymerization of said monomer, evacuating the atmosphere in said chamber to extract air from said veneer sheets, introducing into said chamber a sufficient quantity of liquid plastic monomer to completely cover said veneer sheets, pressurizing said chamber with an inert gas to forcibly impregnate said veneer sheets with said monomer, removing the excess of said monomer after impregnation of said veneer sheets has been completed, applying force to said platens whereby to compress the stack of interleaved sheets together, irradiating the compressed impregnated veneer sheets by exposure to X or gamma rays whereby to effect the in situ polymerization of said monomer impregnant and produce a plurality of fused plastic polymer impregnated veneer sheets, removing the applied force from said platens, and then separating the fused impregnated veneer sheets from the separator sheets.

2. The method of claim 1, in which said monomer is selected from the group consisting of methyl methacrylate, butyl methacrylate, vinyl acetate and a styrene-acrylonitrile mixture.

3. The method of claim 2, in which said chamber is evacuated to a vacuum equivalent to from about 25 to about 29 inches of mercury, in which said chamber is pressurized to from about 15 to about 150 p.s.i.g., and in which the radiation dose to which the impregnated stack of veneer sheets is from about 1.0 to about 1.5 megarads.

UNITED STATES PATENT OFFICE
CERTIFICATE OF CORRECTION

Patent No. 3,607,355                     Dated September 21, 1971

Inventor(s) William A. Loeb

It is certified that error appears in the above-identified patent and that said Letters Patent are hereby corrected as shown below:

Column 4, line 21, "wool" should read -- wood --.

Signed and sealed this 29th day of August 1972.

(SEAL)
Attest:

EDWARD M. FLETCHER, JR.                ROBERT GOTTSCHALK
Attesting Officer                      Commissioner of Patents